(12) United States Patent
Sabaldan Elpedes et al.

(10) Patent No.: US 10,901,198 B2
(45) Date of Patent: Jan. 26, 2021

(54) INTERNAL RETAINER

(71) Applicant: Trijicon, Inc., Wixom, MI (US)

(72) Inventors: Jerry Glen Sabaldan Elpedes, Milford, MI (US); Scott Edmond Vanwambeke, White Lake, MI (US)

(73) Assignee: Trijicon, Inc., Wixom, MI (US)

( * ) Notice: Subject to any disclaimer, the term of this patent is extended or adjusted under 35 U.S.C. 154(b) by 212 days.

(21) Appl. No.: 16/263,190

(22) Filed: Jan. 31, 2019

(65) Prior Publication Data
US 2020/0249460 A1 Aug. 6, 2020

(51) Int. Cl.
G02B 23/16 (2006.01)
F41G 1/38 (2006.01)

(52) U.S. Cl.
CPC ............ G02B 23/16 (2013.01); F41G 1/383 (2013.01)

(58) Field of Classification Search
CPC .......... G02B 23/16; G02B 23/14; F41G 1/383
USPC ........................................................ 359/511
See application file for complete search history.

(56) References Cited

U.S. PATENT DOCUMENTS

| | | |
|---|---|---|
| 2,488,188 A | 11/1949 | Halvorson |
| 2,514,257 A | 7/1950 | Reavis |
| 2,522,897 A | 9/1950 | Rotter |
| 2,632,252 A | 3/1953 | Blais, Sr. |
| 2,657,465 A | 11/1953 | Lloyd |
| 2,738,585 A | 3/1956 | Vissing |
| 2,782,510 A | 2/1957 | Kramm |
| 2,849,795 A | 9/1958 | Vissing |
| 2,889,629 A | 6/1959 | Darkenwald |
| 3,496,642 A | 2/1970 | Pfahler |
| 3,642,345 A | 2/1972 | Akin, Jr. et al. |
| 3,831,285 A | 8/1974 | Vissing |
| 4,596,450 A | 6/1986 | Nydes |
| 4,641,932 A | 2/1987 | Harms |
| 5,011,040 A | 4/1991 | Kinast |
| 5,150,528 A | 9/1992 | Shire |
| 5,401,174 A | 3/1995 | Hansen |
| 6,194,097 B1 | 2/2001 | Nelson et al. |
| 6,416,189 B1 | 7/2002 | Watson |
| 6,811,268 B2 | 11/2004 | Watson |
| 6,971,754 B2 | 12/2005 | Flora |
| 7,049,027 B2 | 5/2006 | Buchanan, Jr. et al. |
| 7,448,509 B2 | 11/2008 | Yang |
| 7,585,080 B2 | 9/2009 | Ballard |
| 7,946,072 B2 | 5/2011 | Tsai |
| 8,292,523 B2 | 10/2012 | Dowell |
| 8,752,246 B2 | 6/2014 | Inoue et al. |
| 8,915,234 B2 | 12/2014 | Gulke et al. |
| 8,915,392 B2 | 12/2014 | Crispin et al. |
| 8,967,425 B2 | 3/2015 | Lee |
| 9,312,526 B1 | 4/2016 | Berkenbush et al. |

(Continued)

Primary Examiner — Euncha P Cherry
(74) Attorney, Agent, or Firm — Harness, Dickey & Pierce, P.L.C.

(57) ABSTRACT

A retainer system is provided for tethering a cap to a body on an optic, where the cap and body define an inner cavity. The retainer system includes a lanyard and an inner attachment. The lanyard is fixed on a first end to a surface of the cap facing the inner cavity. The inner attachment is fixed on a first end to a second end of the lanyard and is fixed on a second end to an inside wall of the body facing the inner cavity. When the cap is closed on the body, the lanyard and inner attachment are contained completely within the inner cavity.

20 Claims, 3 Drawing Sheets

(56) References Cited

U.S. PATENT DOCUMENTS

| | | |
|---|---|---|
| 9,551,551 B2 | 1/2017 | Ilacqua |
| 9,683,812 B2 | 6/2017 | Hamilton |
| 2009/0223959 A1 | 9/2009 | Schulz et al. |
| 2009/0268443 A1 | 10/2009 | Ifland et al. |
| 2012/0154907 A1* | 6/2012 | Schmitt .................. G02B 23/14 359/399 |
| 2012/0187129 A1 | 7/2012 | DeLorme et al. |
| 2013/0293958 A1 | 11/2013 | McDonald |
| 2014/0360082 A1 | 12/2014 | Tsai et al. |
| 2015/0226959 A1 | 8/2015 | Krull |

* cited by examiner

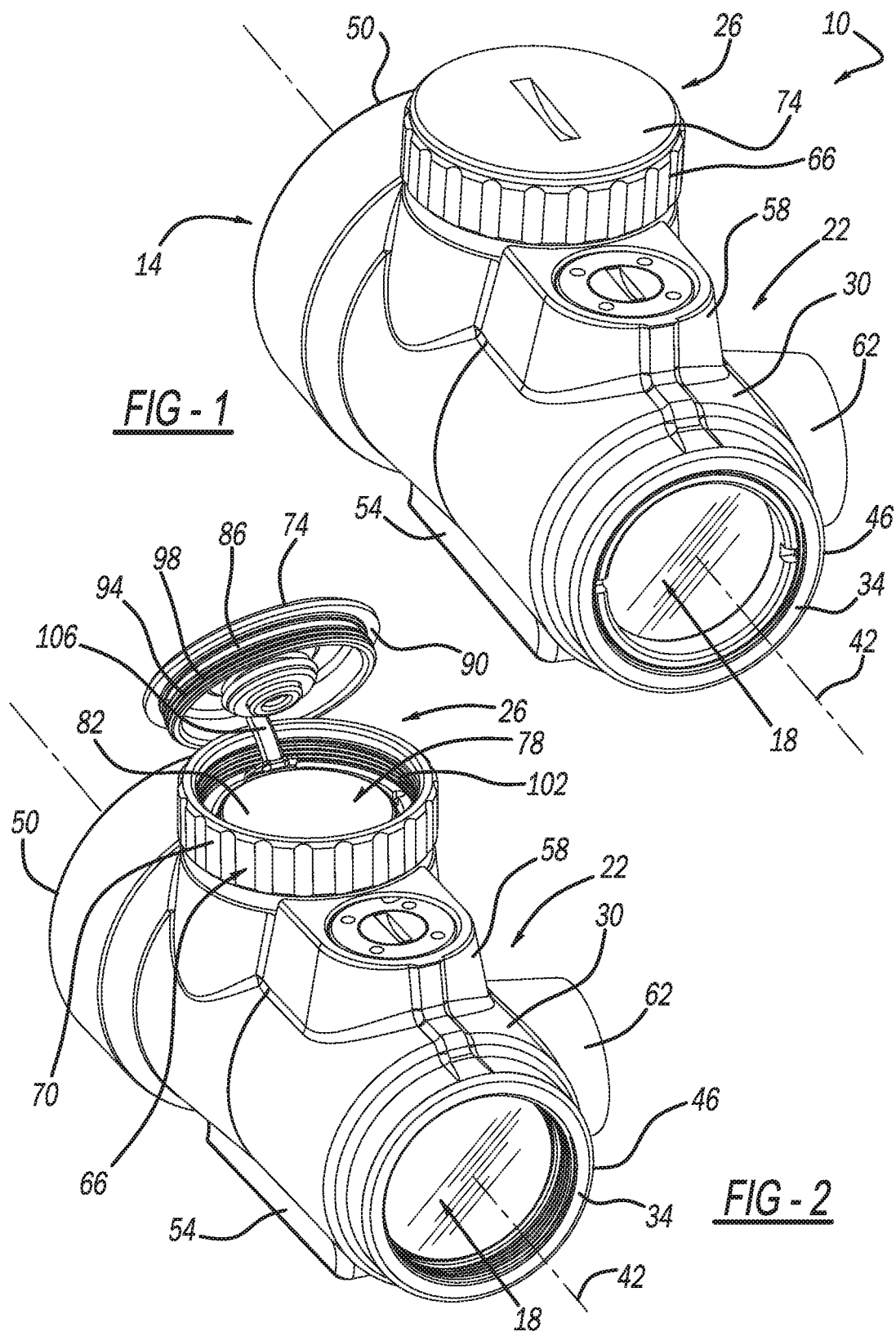

INTERNAL RETAINER

FIELD

The present disclosure relates to optical systems and, more particularly, to an internal retainer for a removable component on an optical system.

BACKGROUND

This section provides background information related to the present disclosure which is not necessarily prior art.

Optical systems often include removable components, such as, for example, caps and covers to protect lenses, control mechanisms, etc. Some cover systems include tethers, or lanyards, to connect the cover or cap with the optical system. The tethers or lanyards often include an external footprint to secure the cover.

SUMMARY

This section provides a general summary of the disclosure, and is not a comprehensive disclosure of its full scope or all of its features.

An example retainer system for tethering a cap to a body on an optic, where the cap and body define an inner cavity, according to the present disclosure includes a lanyard and an inner attachment. The lanyard is fixed on a first end to a surface of the cap facing the inner cavity. The inner attachment is fixed on a first end to a second end of the lanyard and is fixed on a second end to an inside wall of the body facing the inner cavity. When the cap is closed on the body, the lanyard and inner attachment are contained completely within the inner cavity.

In some example embodiments, the lanyard may further include an attachment ring, a lanyard strap, and a fastener. The attachment ring may be fixed to the surface of the cap facing the inner cavity, the fastener may be fixed to the inner attachment, and the lanyard strap may attach the attachment ring to the fastener.

In some example embodiments, the attachment ring, lanyard strap, and fastener may be a monolithic piece.

In some example embodiments, the attachment ring, lanyard strap, and fastener may be deformable.

In some example embodiments, the attachment ring, lanyard strap, and fastener may be formed of a fabric, woven material, rubber, or plastic.

In some example embodiments, the attachment ring may engage a protrusion projecting from the surface of the cap facing the inner cavity.

In some example embodiments, the attachment ring may be retained on the protrusion by a ledge on a free end of the protrusion.

In some example embodiments, the inner attachment may include a base ring and an attachment strap. The base ring may be fixed to the inside wall of the body, and the attachment strap may be fixed to the fastener.

In some example embodiments, the attachment strap may include a slot receiving the fastener therein.

In some example embodiments, a diameter of the slot may be less than a diameter or a width of the fastener of the lanyard.

In some example embodiments, the diameter or width of the fastener may be at least 50% larger than the diameter of the slot such that the fastener is deformed when inserted into the slot and the lanyard is retained in the slot.

In some example embodiments, the base ring and attachment strap may be a monolithic piece.

In some example embodiments, the attachment strap may include at least one preformed bend.

In some example embodiments, the base ring and attachment strap may be deformable.

In some example embodiments, the base ring and attachment strap may be formed of a fabric, woven material, rubber, or plastic.

In some example embodiments, the base ring may be sandwiched between a ring retainer and a base of the body to fix the base ring in the inner cavity.

In some example embodiments, the ring retainer may be threadably engaged with the inside wall of the body.

In some example embodiments, the cap may be threadably engaged with the inside wall of the body. The inside wall of the body may include inner threads that engage both the cover and the ring retainer.

In some example embodiments, the attachment ring, strap, and fastener may be formed of the same material as the base ring and attachment strap.

In some example embodiments, the inner attachment may include a base ring and an attachment strap. The base ring may be fixed to the inside wall of the body, and the attachment strap may be fixed to the second end of the lanyard.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an optical sight in accordance with the principles of the present disclosure.

FIG. 2 is another perspective view of the optical sight of FIG. 1.

Corresponding reference numerals indicate corresponding parts throughout the several views of the drawings.

DETAILED DESCRIPTION

Figure 3:
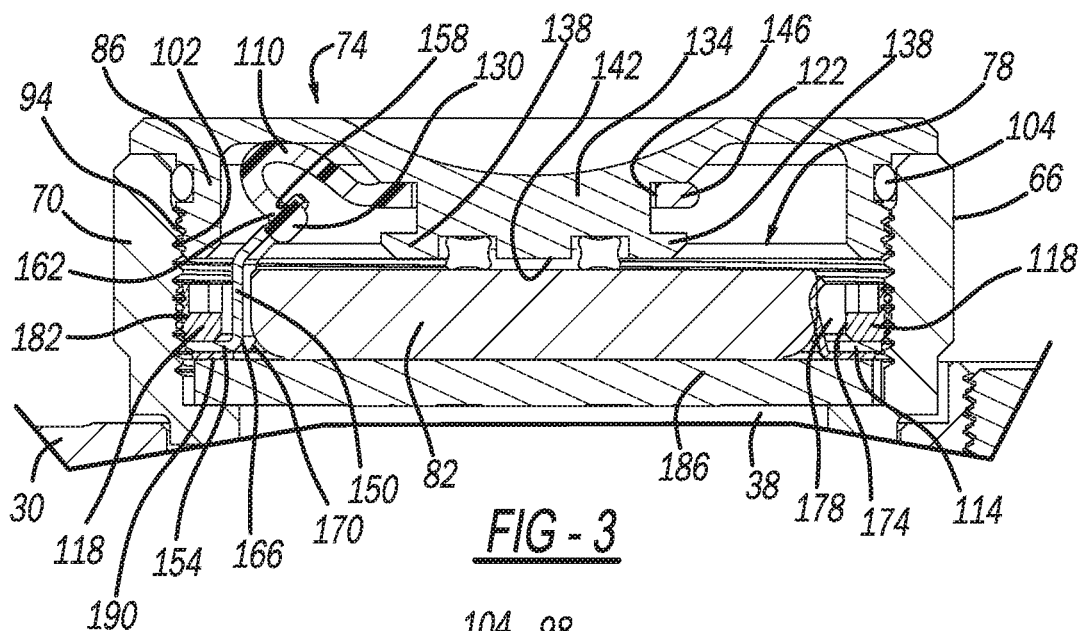
FIG. 3 is a partial cross-sectional view of the optical sight of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Retainer systems, such as lanyard systems, for caps or covers often have an external footprint. These retainer systems can be unsightly, a snag hazard, or get in the way of use of the optic. The latter is most significant if the component being secured is part of a control mechanism requiring frequent manipulation during normal use of the product. The retainer system of the present disclosure is internally contained when not in use to streamline the design of the optic, reduce or eliminate snag hazards, internally protect components, and allow unobstructed use and function of a control mechanism, battery, lens, or other component.

With reference to FIGS. 1 and 2, an optical sight 10 is illustrated. The optical sight 10 may include a housing 14, an optics train 18, an adjustment system 22, and a power storage system 26. The housing 14 is removably attached to a firearm (not illustrated) and supports the optics train 18, the adjustment system 22, and the power storage system 26. The optics train 18 cooperates with the housing 14 to provide a magnified image of a target while the adjustment system 22 position at least a portion of the optics train 18 relative to the housing 14 to properly align a reticle pattern (not shown) associated with the optics train 18 relative to the firearm.

The housing 14 may be removably secured to the firearm and includes a main body 30 and an eyepiece 34. The main body 30 may be a generally tubular member and includes an inner cavity 38 that extends along a longitudinal axis 42 from a first end 46 to a second end 50. The main body 30 further includes a mount 54 for attaching the housing 14 to the firearm, a number of adjustment bodies, for example first and second adjustment bodies 58, 62, for housing the adjustment system 22, and a battery casing 66 for housing the power storage system 26.

The mount 54 is disposed along the longitudinal axis 42 and is generally located between the first end 46 and the second end 50. The mount 54 may include a series of threaded bores (not shown) that either cooperate directly with a mounting feature (not shown) of the firearm or engage a separate mount that cooperates with the mounting feature of the firearm.

The first and second adjustment bodies 58, 62 are disposed projecting from an exterior of the main body 30. The first and second adjustment bodies 58, 62 may house control mechanisms for adjusting various features of the optical sight 10. For example, the first and second adjustment bodies 58, 62 may house windage, elevation, parallax, or other turrets for making lateral, vertical, distance, etc. adjustments to the reticle pattern. While only two adjustment bodies 58, 62 are illustrated, it is understood that any number of adjustment bodies 58, 62 housing control mechanisms may be included on the optical sight 10.

The battery casing 66 is disposed projecting from the exterior of the main body 30 and includes a cylindrical sidewall 70 and a cover 74 that define an inner cavity 78. A battery 82 of the power storage system 26 is disposed within the inner cavity 78.

The cover 74 is removably attached to the sidewall 70 such that the cover 74 can be in a closed position, sealing the inner cavity 78 or an open position, exposing the inner cavity 78. The cover 74 may include a cylindrical wall 86 projecting from an internal surface 90 and into the inner cavity 78 when the cover 74 is in a closed position. The cylindrical wall 86 of the cover 74 may include external threads 94 on an external surface 98 thereof. The sidewall 70 of the battery casing 66 may include internal threads 102 that engage the external threads 94 on the cylindrical wall 86 to threadably attach the cover 74 to the sidewall 70. A seal 104 may be disposed on the external surface 98 of the cylindrical wall 86 of the cover 74 to seal the cover 74 on the sidewall 70. The seal 104 may be an o-ring or other seal that engages the sidewall 70 to create an airtight compartment in inner cavity 78, preventing the passage of debris into the inner cavity 78.

Although the cover 74 is illustrated as being threadably attached to the sidewall 70, the cover 74 may be removably attached to the sidewall 70 by other features. For example, in other embodiments, the cover 74 may be press-fit onto the sidewall 70 to seal the inner cavity 78. In still other embodiments, the cover 74 may be latched onto the sidewall 70 to seal the inner cavity 78. In still other embodiments, the cover 74 may be otherwise secured on the sidewall 70 to seal the inner cavity 78.

The battery casing 66 may further include a retainer system 106 for tethering the cover 74 to the battery casing 66 or main body 30. While the retainer system 106 is described and illustrated as tethering the cover 74 to the battery casing 66, it is understood that the retainer system 106 is not limited to the cover 74 and the battery casing 66, but could be used to tether any cap to the main body 30 or extension thereof. For example only, the retainer system 106 could be used with the adjustment bodies 58, 62 or a lens cap.

Figure 4:
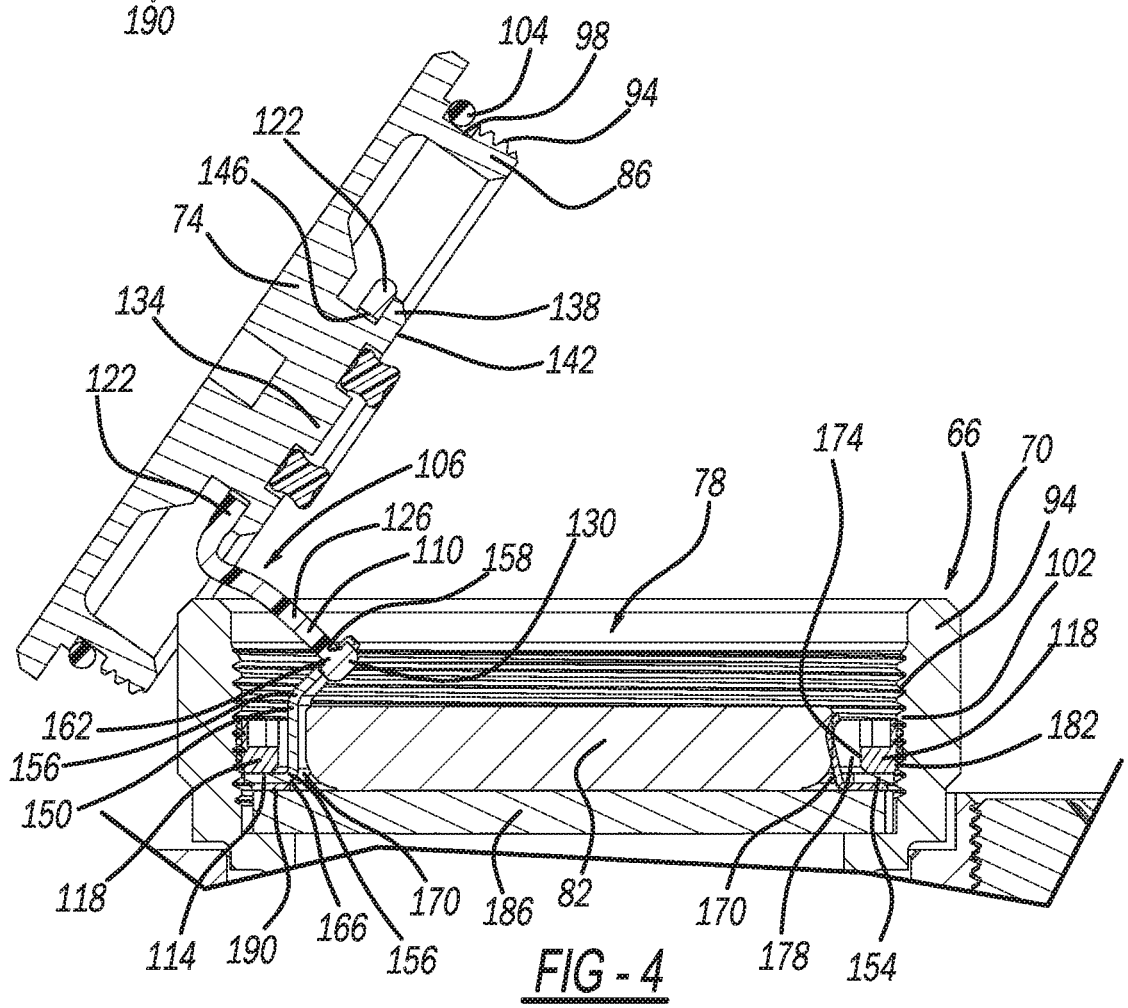
FIG. 4 is another partial cross-sectional view of the optical sight of FIG. 1.
Figure 5:
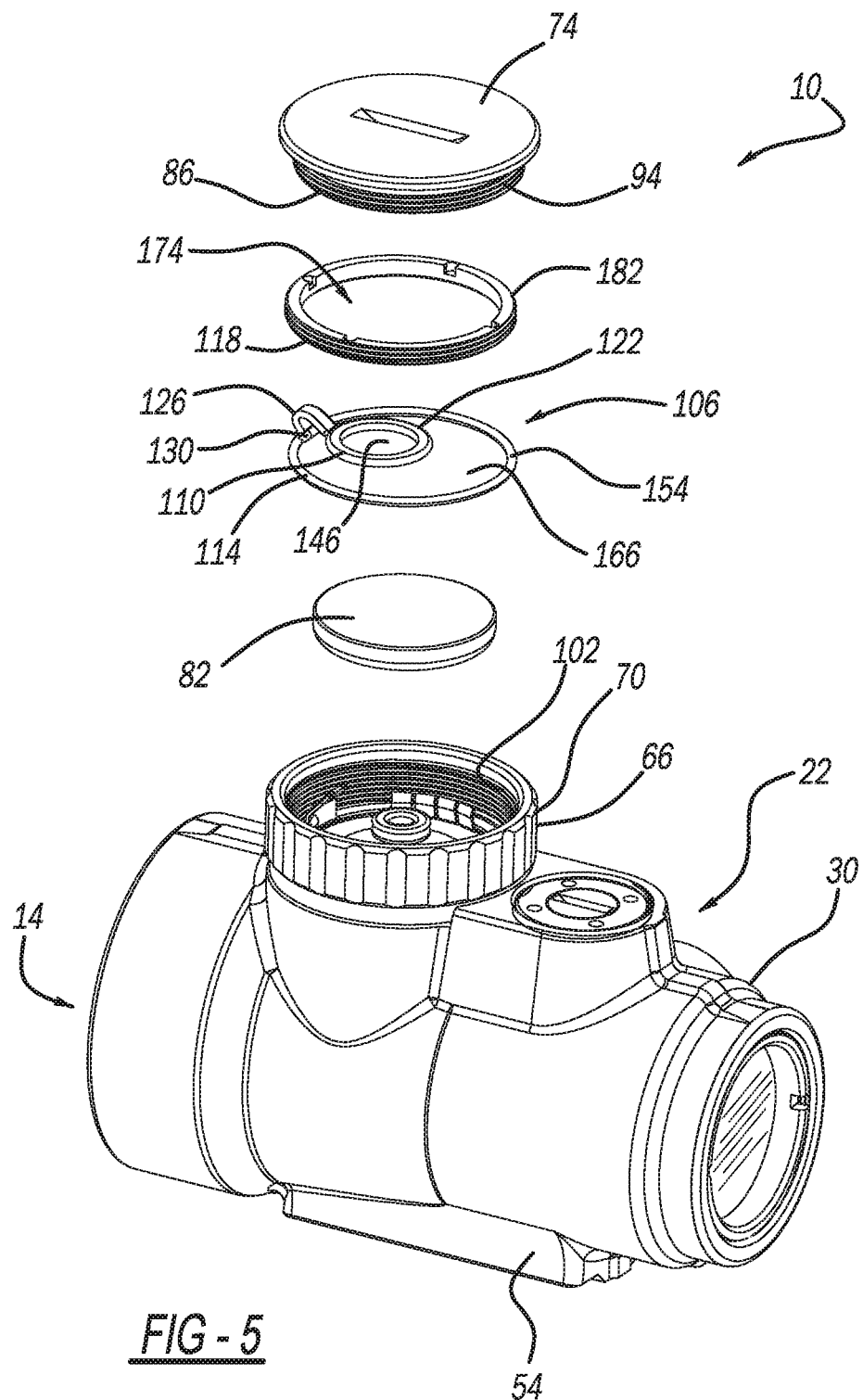
FIG. 5 is a partially exploded view of the optical sight of FIG. 1.

Now referring to FIGS. 2-5, the retainer system 106 may include a lanyard or tether 110, a ring or internal attachment, 114, and a ring retainer 118. The lanyard 110 may further include an attachment ring 122, a strap 126, and a fastener 130. The attachment ring 122, strap 126, and fastener 130 may be a single, integral (monolithic) part (i.e., a single, integral lanyard or tether 110) and may be formed of a deformable material or elastic material such as, for example, fabric, a woven material, nylon, rubber, plastic, or other deformable material. The fastener 130 may be a deformable anchor and may fix the lanyard 110 to the ring 114 as further described below.

The attachment ring 122 is fixed to the cover 74. For example, the cover 74 may include a protrusion 134 projecting into the inner cavity 78. The protrusion 134 may include a ledge 138 on an end 142 thereof. The ledge 138 may be a large diameter portion that forms a stop for retaining the attachment ring 122 on the protrusion 134. The deformable nature of the attachment ring 122 allows the attachment ring 122 to be stretched and deformed such that the protrusion 134 and ledge 138 fit through an aperture 146 in the attachment ring 122. Once over the ledge 138, the attachment ring 122 returns to its original shape and size, and the ledge 138 retains the attachment ring 122 on the protrusion 134. While this is one example of fixing the attachment ring 122 to the cover 74, it is understood that the present disclosure is not limited to this example and could include other features for fixing the attachment ring 122 to the cover, such as adhesive, an anchor in the cover for retaining the attachment ring 122, etc. Additionally, while this is one example of fixing the lanyard 110 to the cover 74, it is understood that the present disclosure is not limited to this example and could include other features for fixing the lanyard 110 to the cover 74 that utilize or do not utilize an attachment ring 122, such as adhesive, an anchor, a fastener, etc.

The ring 114 may further include an attachment strap 150 and a base ring 154. The attachment strap 150 and the base ring 154 may be a single, integral (monolithic) part (i.e., a single, integral lanyard or tether 110) and may be formed of a deformable material or an elastic material such as, for example, fabric, a woven material, nylon, rubber, plastic, or other deformable material. The attachment strap 150 may include a slot 158 that receives the fastener 130 and an end portion 162 of the strap 126 to fix the lanyard 110 to the ring 114. The ring 114 may include pre-formed bends 156 to position the ring 114 and retainer system 106 around the battery 82.

The slot 158 may be sized to have a large diameter or width that is slightly larger than an outer large diameter or width of the strap 126. For example only the large diameter or width of the slot 158 may be less than 10% larger than the outer large diameter or width of the strap 126. The fastener 130 may be sized to have an outer diameter or width that is larger than the large diameter or width of the slot 158 and outer large diameter or width of the strap 126. For example only the outer diameter or width of the fastener 130 may be at least 50% larger than the large diameter or width of the slot 158. Thus, the deformable nature of the slot 158 and the fastener 130 allows the fastener 130 to be compressed and the slot 158 to be stretched such that the fastener 130 is forced through the slot 158 and retained therethrough.

The base ring 154 may be fixed within the inner cavity 78 of the battery casing 66. For example, the base ring 154 is fixed within the inner cavity 78 by the ring retainer 118. The base ring 154 includes an aperture 166 that fits around the battery 82 when the battery 82 is installed in the inner cavity 78. A diameter of the aperture 166 is larger than an outer diameter of the battery 82 such that there is a gap 170 between the base ring 154 and the battery 82.

The ring retainer 118 includes an aperture 174 that fits around the battery 82 when the battery 82 is installed in the inner cavity 78. A diameter of the aperture 174 is larger than an outer diameter of the battery 82 such that there is a gap 178 between the ring retainer 118 and the battery 82. For example, the diameter of the aperture 174 may be equal to or greater than the diameter of the aperture 166.

The ring retainer 118 may be fixed within the inner cavity 78 of the battery casing 66 to retain the base ring 154 in the inner cavity 78. For example, the ring retainer 118 may be threadably fixed within the inner cavity 78. The ring retainer 118 includes external threads 182 that engage with the internal threads 102 on the sidewall 70, such that the ring retainer 118 may be screwed into the sidewall 70. When the ring retainer 118 is fixed to the sidewall, the base ring 154 is sandwiched between the ring retainer 118 and a base 186 or a base ring 190 of the battery casing 66 and therefore fixed within the inner cavity 78. Although the ring retainer 118 is illustrated and described as being threadably fixed within the inner cavity, it is understood that this is one example and the present disclosure is not limited thereto. In other examples, the ring retainer 118 may be press fit into the inner cavity or otherwise fixed within the inner cavity. Further, while the base ring 154 is illustrated and described as being fixed in the inner cavity 78 by the ring retainer 118, it is understood that the present disclosure is not limited to this example and could include other features for fixing the base ring 154 in the inner cavity 78, such as adhesive, an anchor in the inner cover for retaining the base ring 154, etc. Additionally, while this is one example of fixing the ring retainer 118 within the inner cavity 78, it is understood that the present disclosure is not limited to this example and could include other features for fixing the ring retainer 118 that utilize or do not utilize the base ring 154. Some other examples may include adhesive, an anchor in the inner cavity 78, etc.

As previously stated, the retainer system 106 functions to tether the cover 74 to the battery casing 66 or main body 30 (or any other cover/cap to the main body 30). Further, the retainer system 106 is internally contained when not in use to streamline the design of the optic, reduce or eliminate snag hazards, internally protect components, and allow unobstructed use and function of a control mechanism, battery, lens, or other component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A retainer system for tethering a cap to a body on an optic, the cap and body defining an inner cavity, the retainer system comprising:
   a lanyard having a first end and an opposite second end, the first end of the lanyard being fixed to a surface of the cap, the surface of the cap facing the inner cavity;
   an inner attachment having a first end and a second end, the first end of the inner attachment being fixed to the second end of the lanyard, the second end of the inner attachment being fixed to an inside wall of the body, the inside wall of the body facing the inner cavity,
   wherein the lanyard and inner attachment are contained completely within the inner cavity when the cap is closed on the body.

2. The retainer system of claim 1, wherein the lanyard further includes:
   an attachment ring fixed to the surface of the cap;
   a fastener fixed to the inner attachment; and
   a lanyard strap attaching the attachment ring to the fastener.

3. The retainer system of claim 2, wherein the attachment ring, lanyard strap, and fastener are a monolithic piece.

4. The retainer system of claim 2, wherein the attachment ring, lanyard strap, and fastener are deformable.

5. The retainer system of claim 4, wherein the attachment ring, lanyard strap, and fastener are formed of a fabric, woven material, rubber, or plastic.

6. The retainer system of claim 2, wherein the attachment ring engages a protrusion projecting from the surface of the cap.

7. The retainer system of claim 6, wherein the attachment ring is retained on the protrusion by a ledge on a free end of the protrusion.

8. The retainer system of claim 2, wherein the inner attachment further includes:
   a base ring fixed to the inside wall of the body; and
   an attachment strap fixed to the fastener.

9. The retainer system of claim 8, wherein the attachment strap includes a slot receiving the fastener therein.

10. The retainer system of claim 9, wherein a diameter of the slot is less than a diameter or a width of the fastener of the lanyard.

11. The retainer system of claim 10, wherein the diameter or width of the fastener is at least 50% larger than the diameter of the slot such that the fastener is deformed when inserted into the slot and the lanyard is retained in the slot.

12. The retainer system of claim 8, wherein the base ring and attachment strap are a monolithic piece.

13. The retainer system of claim 12, wherein the attachment strap includes at least one preformed bend.

14. The retainer system of claim 8, wherein the base ring and attachment strap are deformable.

15. The retainer system of claim 14, wherein the base ring and attachment strap are formed of a fabric, woven material, rubber, or plastic.

16. The retainer system of claim 8, wherein the base ring is sandwiched between a ring retainer and a base of the body to fix the base ring in the inner cavity.

17. The retainer system of claim 16, wherein the ring retainer is threadably engaged with the inside wall of the body.

18. The retainer system of claim 17, wherein the cap is threadably engaged with the inside wall of the body, the inside wall of the body including inner threads that engage both the cover and the ring retainer.

19. The retainer system of claim 8, wherein the attachment ring, strap, and fastener are formed of the same material as the base ring and attachment strap.

20. The retainer system of claim 1, wherein the inner attachment further includes:
   a base ring fixed to the inside wall of the body; and
   an attachment strap fixed to the second end of the lanyard.

* * * * *